(12) United States Patent
Motoyama (10) Patent No.: US 8,922,507 B2
(45) Date of Patent: Dec. 30, 2014

(54) PROVIDING INFORMATION THROUGH TACTILE FEEDBACK

(75) Inventor: Ken Lee Motoyama, San Jose, CA (US)

(73) Assignee: Google Inc., Mountain View, CA (US)

( * ) Notice: Subject to any disclaimer, the term of this patent is extended or adjusted under 35 U.S.C. 154(b) by 145 days.

(21) Appl. No.: 13/298,802

(22) Filed: Nov. 17, 2011

(65) Prior Publication Data

US 2013/0127735 A1 May 23, 2013

(51) Int. Cl.
*G06F 3/041* (2006.01)
*G06F 3/01* (2006.01)
*G06F 3/0488* (2013.01)

(52) U.S. Cl.
CPC ............ *G06F 3/016* (2013.01); *G06F 3/041* (2013.01); *G06F 2203/04809* (2013.01); *G06F 3/04886* (2013.01)
USPC ......................................................... 345/173

(58) Field of Classification Search
USPC ................................................. 345/173–179
See application file for complete search history.

(56) References Cited

U.S. PATENT DOCUMENTS

| | | | |
|---|---|---|---|
| 5,905,492 | A | 5/1999 | Straub |
| 6,246,407 | B1 | 6/2001 | Wilks |
| 2009/0079550 | A1 | 3/2009 | Makinen et al. |
| 2009/0085878 | A1 * | 4/2009 | Heubel et al. ................. 345/173 |
| 2009/0109007 | A1 | 4/2009 | Makinen et al. |
| 2009/0307623 | A1 * | 12/2009 | Agarawala et al. ............ 715/765 |
| 2010/0152794 | A1 | 6/2010 | Radivojevic et al. |
| 2010/0156822 | A1 * | 6/2010 | Lee et al. ...................... 345/173 |
| 2010/0231540 | A1 * | 9/2010 | Cruz-Hernandez et al. .. 345/173 |
| 2010/0241887 | A1 * | 9/2010 | Chang ........................... 713/323 |
| 2010/0295820 | A1 | 11/2010 | Kikin-Gil |
| 2010/0315345 | A1 | 12/2010 | Laitinen |

FOREIGN PATENT DOCUMENTS

| | | |
|---|---|---|
| WO | WO2006042309 A1 | 4/2006 |
| WO | WO2010009552 A1 | 1/2010 |
| WO | WO2010148306 A1 | 12/2010 |

OTHER PUBLICATIONS

Kate Greene, "Better Touch Screens for Mobile Phones" Technology Review by MIT, http://www.technologyreview.com/Infotech/1861, Jan. 31, 2011 (3 pages).
Chris Foresman, "Apple Flirts with a 3D Interface for Mobile Devices" AppleInsider, http://www.appleinsider.com/articles/08/12/11/apple_working_on_3, Jan. 31, 2011 (10 pages).
Seon-Keun Park et al., "Braille E-Book" Yanko Design, http://www.yankodesign.com/2009/04/17/braille-e-book/, Feb. 2, 2011 (2 pages).
"Tactile 3D—The 3D Interface for Your Windows Computer" http://www.tactile3d.com/, Jan. 31, 2011 (5 pages).
Barry Schwartz, "Google Buys BumpTop, a 3D User Interface for Chrome OS & Android?" Search Engine Roundtable, http://www.seroundtable.com/archives/022135.html, Jan. 31, 2011 (1 page).

(Continued)

*Primary Examiner* — Robin Mishler
(74) *Attorney, Agent, or Firm* — Fish & Richardson P.C.

(57) ABSTRACT

A mobile electronic device includes a housing; a processor; and an interactive display mounted within the housing and communicably coupled to the processor. The display has a tactile interface operable to receive contact from a user and, in response to the contact, provide a perceived first texture of a first portion of the display that is different than a perceived second texture of a second portion of the display. A user-selectable content item is displayed on the second portion of the display that when selected by the user, modifies a content being displayed on the display. The first portion of the display forms a perimeter boundary about the second portion of the display.

26 Claims, 4 Drawing Sheets

(56) References Cited

OTHER PUBLICATIONS

Charles Starrett, "Toshiba Shows iPod Touch with Tactile Interface" 2011 ILounge, http://www.ilounge.com/index.php/news/comments/toshiba-shows-ipo, Jan. 31, 2011 (1 page).

"Braille Touchscreen Technology on the Cards for New Microsoft Products" http://www.redsauce.com/braille-touchscreen-technology-on-the-cards-for-new-microsoft-products, Feb. 2, 2011 (2 pages).

Dr. Ivan Poupyrev, "Research: Tactile User Interfaces" http://ivanpoupyrev.com/projects/tactile.php, Jan. 31, 2011 (8 pages).

Paul Marks, "Nokia Touchscreen Creates Texture Illusion" New Scientist, http://newscientist.com/article/dn19510-nokia-touchscreen-creates-texture-illusion.html, Feb. 2, 2011 (2 pages).

Authorized officer Dong Yun Lee, International Search Report/Written Opinion in PCT/US2012/063855 mailed Mar. 25, 2013, 10 pages.

\* cited by examiner

PROVIDING INFORMATION THROUGH TACTILE FEEDBACK

TECHNICAL BACKGROUND

This disclosure relates to providing information through a graphical user interface with tactile feedback.

BACKGROUND

As technology evolves, advertisers have found an increasing number of techniques for providing information to potential customers. For example, while print and television advertising techniques might have once consumed the majority of ad space and ad formats, online and interactive advertising techniques are now becoming more commonplace. This increase in the number of available ad space and ad formats has occurred alongside innovations in display technologies, such as touchscreens and other technologies that provide a more interactive experience for a user. In some instances, these interactive displays may utilize the sensation of touch (e.g., a tactile interface and/or feedback) to communicate information. The tactile interface may communicate an additional dimension (or dimensions) of information to the user, beyond, for example, a conventional two-dimensional display. Further, such a tactile interface may assist the visually impaired by communicating information normally conveyed through optical techniques through the added dimension or dimensions.

SUMMARY

In one general embodiment, a mobile electronic device includes a housing; one or more processors; memory communicably coupled to at least one of the processors; an interactive display mounted within the housing and communicably coupled to at least one of the processors, the display having a tactile interface operable to receive contact from a user of the display, the tactile interface further operable to provide a perceived first texture of the display that is different than a perceived second texture of the display; and instructions stored in the memory, that when executed on at least one of the processors, cause: a user-selectable content item to be displayed on the display that when selected by the user modifies a content being displayed on the display; the perceived first texture to be provided by the tactile interface to at least a first portion of the display when the user contacts the first portion of the display; and the perceived second texture to be provided by the tactile interface to at least a second portion of the display when the user contacts the second portion of the display, the second portion of the display forming a perimeter boundary about the user-selectable content item and between the user-selectable content item and the first portion of the display.

In a first aspect combinable with the general embodiment, the interactive display further provides a perceived third texture of a third portion of the display that surrounds the first portion of the display and wherein the perceived third texture is different than the perceived first texture.

In a second aspect combinable with any of the previous aspects, the perceived first texture is raised from the tactile interface of the display as compared to the perceived third texture and the perceived second texture.

In a third aspect combinable with any of the previous aspects, at least one of the user-selectable content item displayed on the second portion and a user-selectable content item displayed on the third portion includes an advertisement.

In a fourth aspect combinable with any of the previous aspects, the second portion of the display includes a first sub-portion and a second sub-portion, and the second texture includes at least two distinct perceived textures separately corresponding to the first and second sub-portions.

In a fifth aspect combinable with any of the previous aspects, the user-selectable content item includes first and second user-selectable content items displayed in the corresponding first and second sub-portions, the first and second user-selectable content items including results of an online search initiated by the user.

In a sixth aspect combinable with any of the previous aspects, the first user-selectable content item includes a higher-ranked search result relative to the second user-selectable content item, and the perceived texture of the first sub-portion is raised from the tactile interface of the display as compared to the perceived texture of the second sub-portion.

In a seventh aspect combinable with any of the previous aspects, the first sub-portion appears to at least partially obscure the second sub-portion within the second portion of the display.

In an eighth aspect combinable with any of the previous aspects, the tactile interface is further operable to receive contact from the user to expose the obscured part of the second sub-portion from the first sub-portion.

In a ninth aspect combinable with any of the previous aspects, the perceived second texture of the second portion of the display is indicative of an expected texture of a physical object represented by the user-selectable content item.

In a tenth aspect combinable with any of the previous aspects, the expected texture of the physical object represented by the user-selectable content item includes a liquid and the perceived second texture of the second portion of the display is a wetted texture.

In an eleventh aspect combinable with any of the previous aspects, the expected texture of the physical object represented by the user-selectable content item includes a gas and the perceived second texture of the second portion of the display is a bubbly texture.

In a twelfth aspect combinable with any of the previous aspects, the expected texture of the physical object represented by the user-selectable content item includes a granular material and the perceived second texture of the second portion of the display is a gritty texture.

In another general embodiment, a computer-implemented method for operating a touchscreen interactive display of a mobile device, the display having a tactile interface operable to receive contact from a user of the display and operable to provide a plurality of textures to the user, and including: presenting a user-selectable content item in the touchscreen interactive display; providing a perceived first texture by the tactile interface to at least a first portion of the display when the user contacts the first portion of the display; and providing a perceived second texture, different from the perceived first texture, by the tactile interface to at least a second portion of the display when the user contacts the second portion of the display, the second portion of the display forming a perimeter boundary about the user-selectable content item and located between the user-selectable content item and the first portion of the display.

In a first aspect combinable with this general embodiment, the method further includes receiving contact from the user on the user-selectable content item in the first portion of the tactile interface; and retrieving additional content related to the user-selectable content item based on the contact.

In a second aspect combinable with any of the previous aspects, the method further includes receiving contact from the user on the second portion of the tactile interface; and in response to the contact from the user on the second portion of the tactile interface, not retrieving additional content.

In a third aspect combinable with any of the previous aspects, the method further includes providing a third portion of the tactile interface having a third perceived texture that surrounds the second portion of the tactile interface, the perceived third texture different than the perceived second texture.

In a fourth aspect combinable with any of the previous aspects, the perceived second texture is raised from the tactile interface of the display as compared to the perceived third texture and the perceived first texture.

In a fifth aspect combinable with any of the previous aspects, the user-selectable content item includes an advertisement.

In a sixth aspect combinable with any of the previous aspects, the method further includes providing a first sub-portion and a second sub-portion in the first portion of the tactile interface, wherein the first perceived texture includes at least two distinct perceived textures separately corresponding to the first and second sub-portions.

In a seventh aspect combinable with any of the previous aspects, the user-selectable content item includes first and second user-selectable content items displayed in the corresponding first and second sub-portions, the first and second user-selectable content items including results from an online search initiated by the user.

In an eighth aspect combinable with any of the previous aspects, the first user-selectable content item includes a higher-ranked search result relative to the second user-selectable content item, and the perceived texture of the first sub-portion is raised from the tactile interface of the display as compared to the perceived texture of the second sub-portion.

In a ninth aspect combinable with any of the previous aspects, the method further includes at least partially obscuring the second sub-portion within the second portion of the display.

In a tenth aspect combinable with any of the previous aspects, the method further includes receiving contact from the user to expose the covered part of the second sub-portion from the first sub-portion; and exposing the obscured part of the second sub-portion from the first sub-portion.

In an eleventh aspect combinable with any of the previous aspects, the perceived second texture of the second portion of the display is indicative of an expected texture of a physical object represented by the user-selectable content item.

In a twelfth aspect combinable with any of the previous aspects, the expected texture of the physical object represented by the user-selectable content item includes a liquid and the perceived second texture of the second portion of the display is a wetted texture.

In a thirteenth aspect combinable with any of the previous aspects, the expected texture of the physical object represented by the user-selectable content item includes a gas and the perceived second texture of the second portion of the display is a bubbly texture.

In a fourteenth aspect combinable with any of the previous aspects, the expected texture of the physical object represented by the user-selectable content item includes a granular material and the perceived second texture of the second portion of the display is a gritty texture.

Various implementations of a computing device having a tactile interface system according to the present disclosure may include one or more advantages. For instance, the tactile interface system may provide an additional dimension to an ad space and/or ad format on a mobile device or other computing appliance. For instance, the tactile interface system may add a dimension of "feel" or sensation to an otherwise two-dimensional ad. The tactile interface system may add the additional dimension to more prominently feature a particular content, such as, for example, a particular ad or particular portion of an ad or group of ads. The tactile interface system may also help combat ad blindness, which may arise as traditional advertising, when particular content of an ad is effectively hidden and/or ignored. The tactile interface system may also assist the visually impaired by adding a dimension to a conventional online or mobile ad to communicate relevant advertising or search result information. For instance, the tactile interface system may add the additional dimension (e.g., a particular feel or sensation) to an ad or search result based on the ad content, ad relevance, or other criteria. The tactile interface system may provide for discriminating regions on the interface, such as different sensations for different ads or search results.

Further advantages of a tactile interface system according to the present disclosure may include adding an additional dimension to at least a portion of the interface to distinguish between selectable regions of the display (i.e., hot spots) and unselectable regions (i.e., dead spots) of the display. For example, the tactile interface system may "warn" the user of such hot spots through the added dimension, so as to avoid (or at least reduce) inadvertent selecting of hot spots. For example, if the tactile interface system is part of a mobile electronic device, a touchscreen on the device may be relatively small compared to an average user's fingertip. As such, a hot spot on the touchscreen may be inadvertently selected by a touch of the user's fingertip, suddenly redirecting the user to a new web page (for example), much to the annoyance of the user. Providing a warning area about the hot spot can help the user to avoid accidently touching the hot spot when the user is touching the touchscreen to view the contents shown on the screen.

The tactile interface system may also add two dimensions to one or more portions of the interface display, such as a sensation dimension and a "depth" dimension. In some instance, the depth dimension may be provided to the user through stacked and/or tiered portions with different sensation dimensions. The stacked portions thus may appear to the user to "hover" above other portions of the display, as well as adjacent tiers within the stack. A relative position of one or more tiers of the stack may be determined, for example, by the relative importance and/or relevance of the content of the tiers within the overall stack.

Further advantages of a tactile interface system according to the present disclosure may also include tying content displayed on a particular portion of the interface with the added dimension of sensation. For instance, the tactile interface system may tailor the sensation to the content such that the user experiences an expected feel of the content through the interface. One example may be an expected "gritty" feel for content including an ad for a beach resort. As another example, a tactile interface system may be used as a method to specify customizations of a user interface so that the user may interact with the device based on touch. For example, a unique hot spot on the interface may be generated to bring up a search feature on a mobile device so that the user does not need to visually concentrate on the display.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DETAILED DESCRIPTION

In some embodiments of the present disclosure, a mobile electronic device may include an interactive display mounted within a housing that includes a tactile interface. The tactile interface, in operation, receives contact from a user of the device (e.g., through fingertip contact or otherwise) and, in response to the contact, may provide a perceived texture or tactile sensation to the user. The device provides user-selectable content regions to the user on the tactile interface. At least a portion of the user-selectable content has a particular tactile sensation and is surrounded by another portion of the tactile interface with another particular tactile interface.

Figure 1:
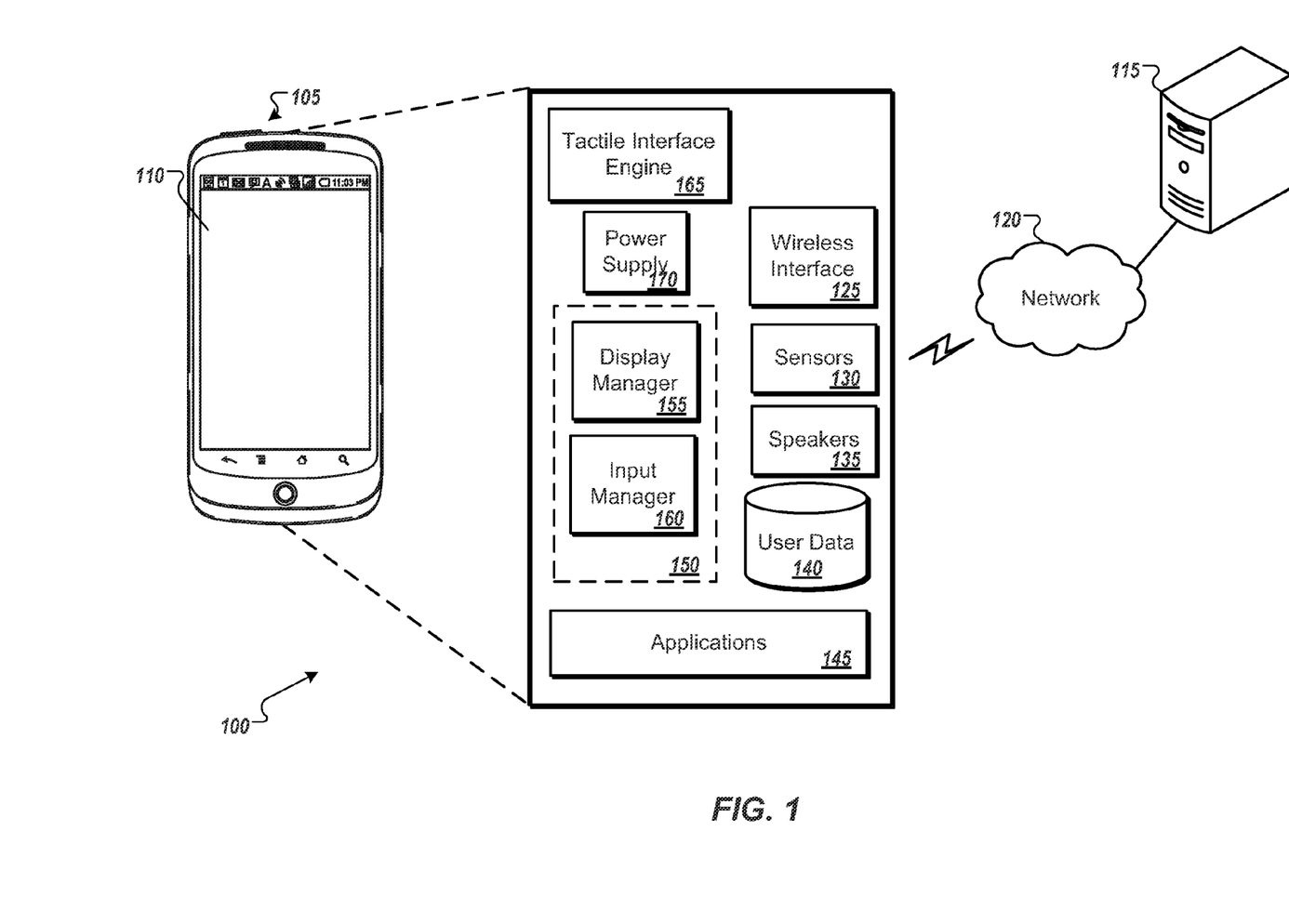
FIG. 1 illustrates an example architecture for a computing system including a computing device with a tactile interface according to the present disclosure.

FIG. 1 illustrates an example architecture for a computing system 100 including a computing device 105 with a tactile interface 110. In general, the system 100 includes the computing device 105 (e.g., a mobile device such as a smart phone) with a tactile interface 110, where the tactile interface 110 can be used as a user interface for the computing device 105. A number of components within the computing device 105 provide for user interaction with the computing device 105. For purposes of clarity, FIG. 1 shows certain example components of the computing device 105. While the computing device 105 is illustrated here as a mobile communication device, i.e., a smart phone, alternative embodiments of the system 100 may include computing devices such as cell phones, laptops, or other computing appliances. Each of the computing devices communicably coupled to the system 100 may include a tactile interface such as the tactile interface 110 illustrated in FIG. 1.

The tactile interface 110, in some embodiments, may be a touchscreen that provides a tactile or haptic response to the user upon contact between the skin of the user (e.g., a fingertip) and the interface 110. The tactile interface 110 may provide the user with a sense of touch, i.e., a combination of sensations evoked by stimulating the skin. In some cases, the tactile interface 110 may communicate information to the user through such sensations, such as through perceived textures and perceived tiny surface variations of the interface 110. As explained more fully below, such sensations may be generated by a tactile interface engine 165.

The computing device 105 can communicate with server 115 through a network 120 using a wireless interface 125. The network 120 can be the internet or a cellular network. For example, the computing device 105 can direct telephone calls through a telephone network or through a data network using voice over internet protocol (VOIP). In addition, the computing device 105 can transmit other forms of data over the internet, for example, data in the form of Hypertext Transfer Protocol (HTTP) requests that are directed at particular web sites. The computing device 105 may receive responses, for example, in forms that can include but are not limited to mark-up code for generating web pages, media files, and electronic messages.

A number of components running on one or more processors included in the computing device 105 enable a user to interact with the tactile interface 110 to provide input and to receive visual output. For example, an interface manager 150 can manage interaction with the tactile interface 110, and includes a display manager 155 and an input manager 160.

The display manager 155 can manage the information displayed to a user using the tactile interface 110. For example, an operating system running on the computing device 105 can use the display manager 155 to arbitrate access to the tactile interface 110 for a number of applications 145 running on the computing device 105. For example, the computing device 105 can display a number of applications, each in its own window on the tactile interface 110, and the display manager 155 can control what portions of each application are shown on the tactile interface 110. In another example, the display manager 155 can control the displaying of a virtual artifact.

The input manager 160 can control the handling of data received from a user using the tactile interface 110 or other input mechanisms. For example, the input manager 160 can coordinate with the display manager 155 to identify where, on the tactile interface 110, a user is entering information so that the computing device 105 can determine the context of the input. In addition, the input manager 160 may determine which application or applications should be provided with the input. For example, input to the computing device 105 using the tactile interface 110 can be a user placing their finger on the touchscreen display while manipulating the computing device 105. The area of the computing device 105 touched by the user's finger can determine which of the applications 145 the computing device 105 launches and runs.

The computing device 105 can provide visual, haptic and audio feedback as the user manipulates the tactile interface 110, through, for example contact between the user (e.g., through one or more fingers) and the interface 110. The computing device 105 can provide visual feedback using the display manager 155 to display a virtual artifact (e.g., web page, electronic message, application or GUI, or other artifact) on the tactile interface 110. The computing device 105 can provide audio feedback using the one or more processors installed in the computing device 105 to generate audio tones (e.g., beeps, clicks) for audio output on one or more speakers 135. The computing device 105 can provide audio feedback using the one or more processors installed in the computing device 105 to generate spoken words for output on the one or more speakers 135. The spoken words can be based on a selected item or action by a user manipulating the computing device 105 while controlling a virtual artifact to select the item or action.

A user data database 140 may store information about particular user preferences or parameters. For example, the database 140 may store an identifier of an application that is to implement virtual artifacts and receive input from the interface manager 150 and the one or more sensors 130. For example, a music application may be set by default to implement virtual artifacts while the user touches the tactile interface 110 by placing their finger on the edge of the tactile interface 110.

In another example embodiment (not shown), the user data database 140 may be a subset of and/or a local copy of a database residing on the server 115. For example, all or a portion of data illustrated as being stored in the user data database 140 may be stored in a logically-distinct user data database residing on the illustrated server 115 (or another server). Then, some of the data stored on the server can be saved, replicated, and/or transmitted to the user data database 140.

The illustrated computing device 105 also includes a power supply 170. In some embodiments, the power supply 170 may provide, for example, electrical power to one or more components of the device 105. For example, the power supply 170 may provide power to the sensors 130, the speakers 135, a tactile interface engine 165, and one or more processors on the device 105. The power supply 170 may be a battery, for example a small lightweight battery such as a paper battery or a watch battery. Alternatively the power supply 170 may be connected to a mains electricity system.

The illustrated computing device 105 also include a tactile interface engine 165. The computing device 105 can use the tactile interface engine 165 to provide haptic feedback to the user through the tactile interface 110. In some implementations, the tactile interface engine 165 may include an actuator constructed as a sandwich of piezoceramic film layers with adhesive electrodes in between. The piezoceramic material may either shrink or expand depending on the polarity of an applied voltage (e.g., from the power supply 170). In other words, the layers may be of opposite polarity so that when a voltage signal is applied, the layered structure bends. This "bending motor" configuration may consist of only two layers or may include more layers (of alternating polarities) of thin piezoceramic layers. Such bending motors experience a relationship between the applied voltage, the layer thickness, and the displacement (e.g., the "bend"). This relationship may be defined, for example, by the equations:

$$D = \frac{a_1 V}{T^2} \text{ and } F = a_2 TV,$$

where
D is the displacement, V is the applied voltage, T is the layer thickness, and $a_1$ and $a_2$ are coefficients. In some cases, maximum displacement may be achieved with an applied voltage of 8-10V peak-to-peak. In one specific example embodiment, the applied voltage may be a maximum of about 3.7V.

The displacement generated by the tactile interface engine 165 may produce a tactile or haptic sensation on the tactile interface 110. In some cases, the tactile interface 110 produces tactile sensations only to the touching finger, not to the hand holding the device 105 by, for example, including a damper (e.g., a silicone barrier) between the interface 110 and the device 105. This may allow, for example, the tactile interface 110 to be displaced by the tactile interface engine 165 while cushioning the impact on the device frame.

The displacement of the tactile interface engine 165 may be small (e.g., about 0.05 mm) while an acceleration of the displacement (i.e., how fast the displacement is produced) may still produce sharp tactile sensations.

In some implementations, the tactile interface 110 in combination with the tactile interface engine 165 may be operable to detect touch inputs from a user based on capacitive coupling between electrodes in the engine 165 and the user. For example, the tactile interface engine 165 may include layers of electrode elements separated by a layer of dielectric material. When a voltage difference is applied across the electrode elements an effective capacitor, having a detectable capacitance, is formed. When human contact is applied to the tactile interface 110, the contact (e.g., the user's finger) is separated from the electrode elements by the layer of dielectric material. Because the human contact has a potential that is different to at least one of the electrode elements, a capacitor is formed between the electrode element and the user.

The user may thus capacitively couple with the electrode elements of the tactile interface engine 165 simultaneously, resulting in a change to a value of the capacitance between the electrode elements. The tactile interface 110 is operable to provide haptic feedback to the user through the capacitive coupling between the electrode elements and the user's skin. The capacitive coupling may thus result in an electrical charge being induced in user (e.g., in the nerve endings of the user's finger). The charge induced in the user may depend on the voltage difference between the electrode elements in the tactile interface engine 165; if sufficiently large, the charge may provide a tactile sensation to the user (e.g., through transcutaneous electrical nerve stimulation (TENS)). In some embodiments, the user may calibrate the intensity of tactile stimulation by increasing or decreasing the voltage difference applied to the electrode elements of the tactile interface engine 165.

The tactile feedback may provide haptic information to the user. For example, upon detection of human contact via the tactile interface 110, the interface 110 may be controlled by one or processors through the tactile interface engine 165 in the computing device 105 to activate electrode layers within the area of the tactile interface 110 at which the input was received to provide stimulation of the nerves in the user. The user thus becomes aware that the contacting input has been acknowledged by the computing device 105.

The haptic feedback may be localized in that only portions of electrode layers are controlled to provide tactile stimulation, such as the portions in specific or predetermined areas of the tactile interface 110. For example, as explained further below, the tactile interface engine 165 and tactile interface 110 may control portions of the electrode layers of the tactile interface engine 165 to provide haptic feedback to the user in certain portions of the tactile interface 110 according to, for instance, content of one or more virtual artifacts displayed to the user through the tactile interface 110.

As will be appreciated, the tactile interface engine 165 is one of several embodiments of an apparatus for providing tactile, or haptic, response to a user of a mobile device as described above. Other embodiments of the tactile interface engine 165 (or other engine operable to provide such tactile or haptic response), including those implemented using other conventional techniques, are within the scope of the present disclosure. Thus, the example non-limiting techniques and descriptions provided herein are but examples that fall within the scope of this disclosure.

In other example embodiments, the tactile interface engine 165 may be implemented as including a vibrating motor to provide tactile feedback to the end user, for example when the end user is approaching a hot spot. The vibrating motor may include, for example, a small DC motor which drives a gear attached to a small weight. This weight is mounted off-center on the gear and when the motor spins the gear/weight combination (e.g., at 100 to 150 RPM), the off-center mounting causes a strong vibration.

In other example embodiments, heat dissipated by internal circuitry in the computing device 105 may be channeled behind and/or on the tactile interface 110. Such heat may, in some aspects, create regions of the tactile interface 110 with an elevated temperature to, for example, signify some particular content (e.g., selectable and/or displayable) on the interface 110. Of course, such embodiments may be implemented concurrently with and/or separate from embodiments including a vibrating motor and/or layers of electrode elements described above.

Figure 2A:
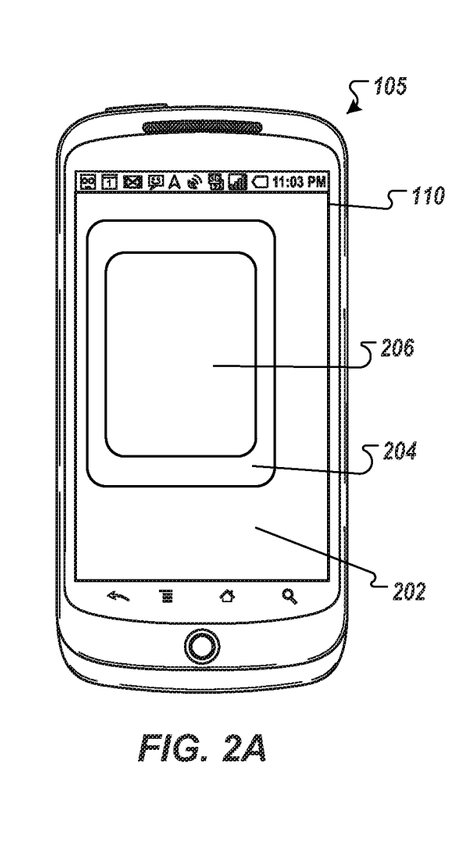
FIGS. 2A-2D illustrate example embodiments of a computing device with a tactile interface according to the present disclosure.

FIGS. 2A-2D illustrate example embodiments of a computing device 105 with a tactile interface 110. Turning to FIG. 2A particularly, the computing device 105 having the tactile interface 110 also includes several distinct regions of the interface 110, including a first region 202, a second region 204, and a third region 206. Each of the regions 202, 204, and 206 may comprise a portion of the total, viewable display area of the tactile interface 110. In some embodiments, each of the regions 202, 204, and 206 may be separated and/or defined according to content being displayed on the tactile interface 110. In some instances, for example, the content can be web content, such as web pages, images, ads, or other content. The content can be divided, for instance, into selectable regions (e.g., hot spots) and unselectable regions (e.g., dead spots). In some aspects, the hot spots may represent regions of the tactile interface 110 in which contact from the user may be registered and instigate further action by the computing device 105, such as, for example, retrieval of additional content and/or modify device settings (e.g., reduce device speaker volume, mute device speaker, modify device backlighting or other modification). The dead spots, in contrast, may represent regions of the tactile interface 110 in which the content being displayed is only viewable by the user, rather than selectable. For instance, user contact with a dead spot may not result in any additional action being taken by the computing device 105.

As illustrated in FIG. 2A, the first region 202 is separated from the third region 206 by the second region 204. In the illustrated embodiment, the first region 202 may be a dead spot, which contains viewable, but not selectable, content. The third region 206, however, may be a hot spot, which contains selectable content, such as, for example, a web ad or other content. The second region 204 may thus be a boundary between the first and third regions 202 and 206, respectively. In some aspects, the second region 204 may also be a dead region (e.g., unselectable region). Thus, user contact with the second region 204 may not select any content.

In some aspects, the tactile interface 110 and tactile interface engine 165 may be operable to provide a haptic feedback to the user upon contact with only the second region 204. For instance, by providing haptic sensation in only the second region 204 (compared to the first and third regions 202 and 206, respectively), the tactile interface 110 may prevent the user from unintentional selections of content, such as the content displayed in the third region 206. For instance, the tactile sensation of the second region 204 may indicate to the user the proximity of a selectable-region (i.e., hot spot) in the third region 206.

In some aspects, the tactile interface 110 and tactile interface engine 165 may be operable to provide a delay to any action taken when the selectable content of the third region 206 is contacted by the user based on, for example, previous contact with the second region 204. For instance, when the user contacts the second region 204, the tactile interface 110 may provide a haptic feedback within only the second region 204 (e.g., sensation of a raised or rough surface or other sensation) in order to warn the user that contact is approaching a selectable content (i.e., hot spot) within the third region 206. The effect can be similar to rumble strips on the edge of a highway lane. As an operator of a vehicle drives the vehicle over a line marking the boundary of the lane, the tires of the vehicle travel over the rumble strip and provide a tactile and audible feedback to the operator that the vehicle is traveling in a dangerous zone and is not within the boundary of the lane. The second region that surrounds the user selectable contact can provide a similar warning to the user that he/she is crossing into a region of the touchscreen that, upon contact, will redirect him/her to different content, e.g., to a new web page. If this was unintended by the user, he/she can take corrective action.

In some implementations, based on the user contact with the second region 204, any subsequent action initiated through contact with the third region 206 may be delayed, in order to account for a mistake by the user in contacting the third region 206. After a predetermined time delay, for example, contact with the third region 206 may result in action being taken by the computing device 105 according to the content displayed in the third region 206.

Figure 2B:
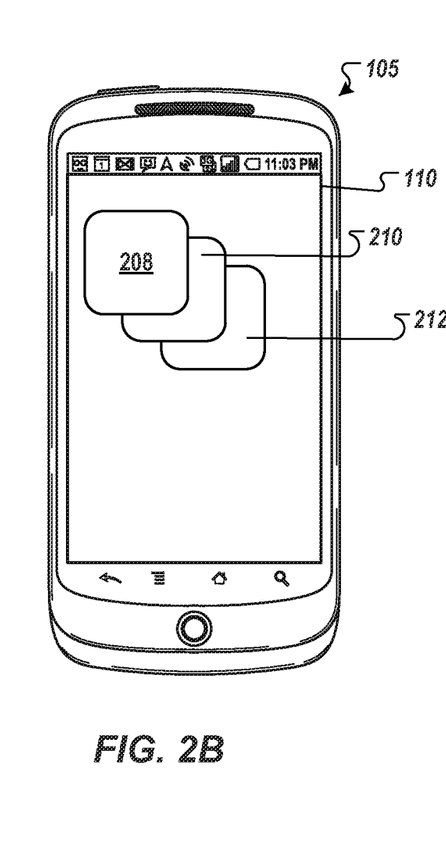

Turning to FIG. 2B, this figure illustrates another example embodiment of the computing device 105 with the tactile interface 110. The embodiment of the computing device 105 in this figure also includes multiple regions within the display of the tactile interface 110, including a first region 208, a second region 210, and a third region 212. Of course, more or fewer regions may also be possible.

As illustrated, each of the three regions 208, 210, and 212 may provide distinct haptic feedback sensations to the user of the computing device 105. For example, in some embodiments, each region 208, 210, and 212 may provide a distinct feeling of "roughness" to the user upon contact. The distinct roughness sensations (or other sensations) may be formed, for example, by the tactile interface engine 165 generating distinct voltage potentials in electrode elements within the distinct regions 208, 210, and 212, respectively.

In some embodiments, each of the regions 208, 210, and 212 may represent ad content returned from, for example, a search of web content performed on the computing device 105. In some aspects, as illustrated, ad content that is particularly relevant may be displayed in the first region 208, with web content with declining relevance displayed in the second and third regions 210 and 212, respectively. For instance, ad content with the most relevance to the user's search may be displayed in the first region 208 with a particular roughness sensation, while ad content with the next most relevance may be displayed in the second region 210 with another particular roughness sensation, and so on.

In some embodiments, one or more of the regions 208, 210, and 212 may be moved within the tactile interface 110 to reveal obscured regions or other portions of the tactile interface 110. For instance, while the first region 208 may display the most relevant ad content (or other content), the user may choose to select the ad content displayed in the second region 210. The user may thus "drag" the first region 208 away from the second region 210 in order to expose the entirety of the second region 210. In some aspects, the user can have a sensation of touching and dragging the top region (i.e., the first region 208) off the lower regions (i.e., second and third regions 210 and 212 respectively) to reveal additional content.

In some embodiments, one or more regions of displayed content, such as the regions 208, 210, and 212, may provide haptic feedback to the user that corresponds to the displayed content within the particular region. For instance, the haptic feedback may be substantially similar to a perceived sensation the user would experience if the user physically contacted the content being displayed. As one example, if the content displayed in the first region 208 corresponds to an ad for a beach resort, the haptic feedback provided to the user in the first region 208 may be gritty like sand. As another example, if the content displayed in the first region 208 corresponds to an ad for a carbonated beverage, the haptic feedback provided to the user in the first region 208 may be bubbly. As yet another example, if the content displayed in the first region 208 corresponds to an ad for a hand lotion, the haptic feedback provided to the user in the first region 208 may be liquid and/or gel. Each of the haptic sensations providing a particular perceived sensation may be generated, for example, by the tactile interface engine 165 by manipulating voltage potentials between the electrode elements corresponding to the particular regions of the tactile interface 110.

Figure 2C:
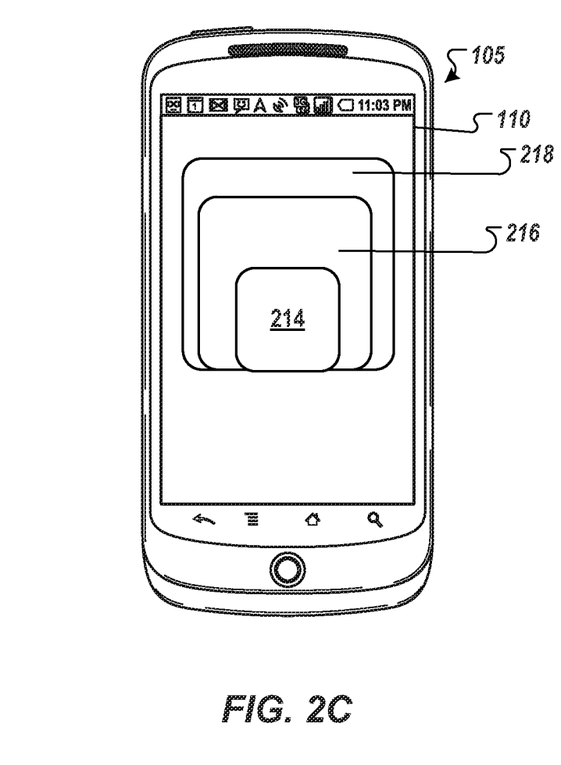
Figure 2D:
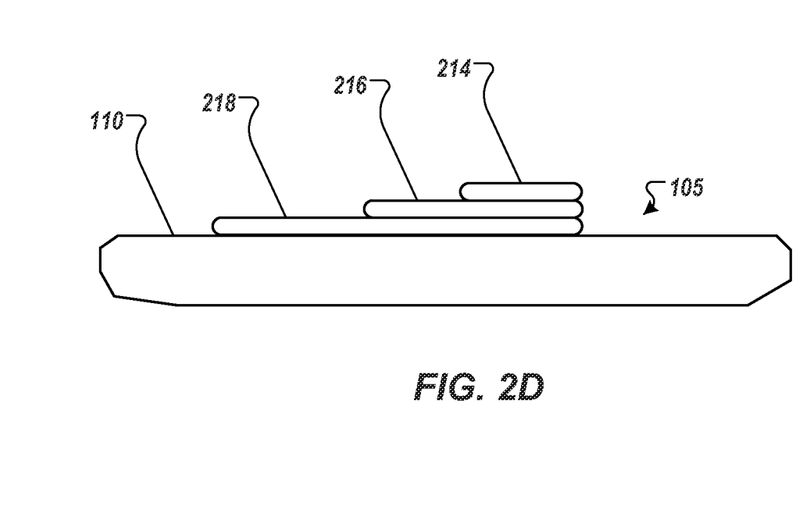

Turning to FIGS. 2C-2D, another embodiment of the computing device 105 having the tactile interface 110 is illustrated in a plan and side view, respectively. In the illustrated embodiment of the computing device 105 with the tactile interface 110 of FIGS. 2C-2D, several regions 214, 216, and 218 on the tactile interface 110 may have different perceived heights, or levels, above the tactile interface 110.

For example, as illustrated, content, such as ad content, may be displayed in the tactile interface 110 such that the content is contained within particular regions (e.g., a first region 214, a second region 216, and a third region 218). The regions 214, 216, and 218 may be displayed on top of each other (as illustrated) or adjacent to each other but with distinct perceived heights above the tactile interface 110. As illustrated in FIG. 2D, the perceived height above the tactile interface 110 of the first region 214 is greater than the perceived height of the second region 216, which is greater than the perceived height of the third region 218. As illustrated, moreover, the displayed regions, which may each display different content, are differently sized in area on the tactile interface 110, thereby allowing the user to access each of the regions 214, 216, and 218, through contact. In some aspects, a particular perceived height of a region may be tied to, for example, the content displayed in the region. For example, if the displayed content of several regions (such as regions 214, 218, and 218) are ads, the advertisers may pay more money for an ad placement in a region with a higher perceived level (such as the first region 214). Each of the different perceived height sensations may be generated, for example, by the tactile interface engine 165 by manipulating voltage potentials between the electrode elements corresponding to the particular regions of the tactile interface 110.

Figure 3:
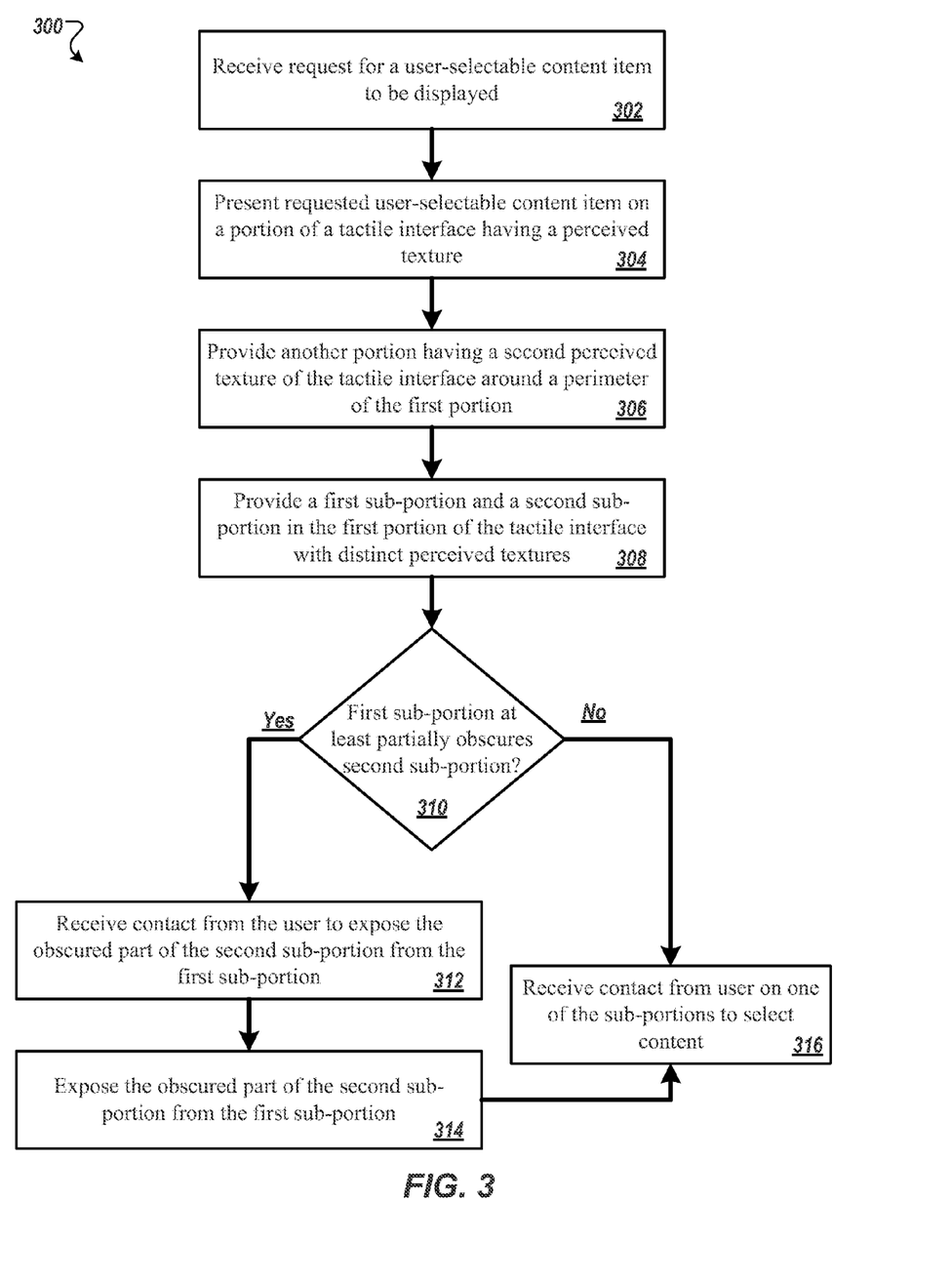
FIG. 3 illustrates an example method for using a computing device with a tactile interface according to the present disclosure.

FIG. 3 illustrates an example method for using a computing device with a tactile interface according to the present disclosure. In some embodiments, the method 300 may be executed on, for example, the computing device 105 having the tactile interface 110 and the tactile interface engine 165 as described in FIG. 1. Method 300 may also be performed or executed on other computing devices having tactile interfaces operable to provide haptic feedback to a user.

Method 300 may begin at step 302, when the computing device receives a request for a user-selectable content item to be displayed. The content item may be displayed, for example, on a tactile interface in one or more regions of the interface. In some aspects, the user-selectable content item may be a hot spot which, when contacted by the user, initiates an action by the computing device, such as retrieving additional content. In some instances, the content is ad content. Further, in some instances, a user-selectable-content item may be displayed on the tactile interface not in response to a user request, but during operation of the mobile device absent user interaction (e.g., during viewing of some content by the user).

In step 304, the computing device presents the requested user-selectable content item on a portion of a tactile interface having a perceived texture, or haptic sensation. For example, the requested content may be displayed in a particular region on the tactile interface with a particular haptic sensation feedback. The feedback, for instance, may be a predetermined sensation (e.g., rough or raised) or may correspond to the content, as explained above. As described, above, in the instances in which the user-selectable content item is displayed not in response to any user request, then the computing device may present and/or display user-selectable content item on a portion of the tactile interface having a perceived texture.

In step 306, the computing device provides another portion of the tactile interface having a second perceived texture around a perimeter of the first portion. In some aspects, the perceived texture, or haptic sensation, within the first portion is different than the perceived texture in the portion surrounding the first portion (i.e., as shown in FIG. 2A). For instance, the perceived texture of the first portion may be relatively smooth, i.e., with no texture beyond the normal feel of the tactile interface. The perceived texture of the portion surrounding the first portion may be rough, thereby differentiating from the first portion.

In step 308, the computing device provides a first sub-portion and a second sub-portion in the first portion of the tactile interface with distinct perceived textures. For example, within the display area bounded by the first portion, two or more sub-areas may be generated, each having a different perceived haptic sensation. If the first sub-portion at least partially obscures a second sub-portion in step 310, then the computing device may receive contact from the user to expose the obscured part of the second sub-portion from the first sub-portion in step 312. For example, as described above, the user may "drag" certain portions of the displayed content on the tactile interface in order to expose other content. In step 314, the computing device may expose the obscured part of the second sub-portion from the first sub-portion based on the received contact from the user.

If the first sub-portion does not at least partially obscure second sub-portion in step 310, or when the obscured part of the second sub-portion has been exposed in step 314, then the computing device may receive contact from the user on one of the sub-portions to select the displayed content in step 316.

A number of implementations have been described. Nevertheless, it will be understood that various modifications may be made. For example, additional aspects of method 300 may include more steps or fewer steps than those illustrated in FIG. 3. Further, the steps illustrated in FIG. 3 may be performed in different successions than that shown in the figure. Other variations in the order of steps in method 300 are also possible. Accordingly, other implementations are within the scope of the following claims.

What is claimed is:

1. A mobile electronic device, comprising:
    a housing;
    one or more processors;
    memory communicably coupled to at least one of the processors;
    an interactive display mounted within the housing and communicably coupled to at least one of the processors, the display having display surface and a tactile interface operable to receive contact from a user of the display, the tactile interface further operable to provide a perceived first texture of the display and a perceived second texture of the display that is different from the perceived first texture of the display; and
    instructions stored in the memory, that when executed on at least one of the processors, cause:
        a first user-selectable content item to be displayed on the display and in a first portion of the display, the first user-selectable content item comprising a first search result provided for display in response to a search;
        a second user-selectable content item to be displayed on the display and in a second portion of the display that is different from the first portion of the display, the second-user-selectable content item comprising a second search result provided for display in response to the search, the first search result being ranked higher than the second search result in a search result ranking for the search;

the perceived first texture to be provided by the tactile interface to at least the first portion of the display when the user contacts the first portion of the display, the perceived first texture providing a sensation to the user that the first portion of the display is raised from the display surface by a first perceived distance; and the perceived second texture to be provided by the tactile interface to at least the second portion of the display when the user contacts the second portion of the display, the perceived second texture providing a sensation to the user that the second portion of the display is raised from the display surface by a second perceived distance different from the first perceived distance, wherein the first perceived distance is greater than the second perceived distance based on the first search result being ranked higher than the second search result.

2. The mobile electronic device of claim 1, wherein the instructions further cause a perceived third texture to be provided by the tactile interface to at least a third portion of the display that surrounds the first portion of the display when the user contacts the third portion of the display, and the perceived third texture is different than the perceived first texture.

3. The mobile electronic device of claim 2, wherein the perceived first texture is raised from the tactile interface of the display as compared to the perceived third texture.

4. The mobile electronic device of claim 2, wherein the instructions further cause an advertisement to be displayed on the display.

5. The mobile electronic device of claim 1, wherein the first portion appears to at least partially obscure the second portion.

6. The mobile electronic device of claim 5, wherein the tactile interface is further operable to receive contact from the user to expose the obscured part of the second portion from the first portion.

7. The mobile electronic device of claim 1, wherein the perceived first texture of the first portion of the display is indicative of an expected texture of a physical object represented by the first user-selectable content item.

8. The mobile electronic device of claim 7, wherein the expected texture of the physical object represented by the first user-selectable content item comprises a liquid and the perceived first texture of the first portion of the display is a wetted texture.

9. The mobile electronic device of claim 7, wherein the expected texture of the physical object represented by the first user-selectable content item comprises a gas and the perceived first texture of the first portion of the display is a bubbly texture.

10. The mobile electronic device of claim 7, wherein the expected texture of the physical object represented by the first user-selectable content item comprises a granular material and the perceived first texture of the first portion of the display is a gritty texture.

11. A computer-implemented method for operating a touchscreen interactive display of a mobile device, the display having a display surface and a tactile interface operable to receive contact from a user of the display and operable to provide a plurality of textures to the user, and comprising:

presenting a first user-selectable content item in a first portion of the touchscreen interactive display, the first user-selectable content item comprising a first search result provided for display in response to a search;

providing a perceived first texture by the tactile interface to at least the first portion of the display in response to the user contacting the first portion of the display, the perceived first texture providing a sensation to the user that the first portion of the display is raised from the display surface by a first perceived distance;

presenting a second user-selectable content item in a second portion of the display that is different from the first portion of the display, the second user-selectable content item comprising a second search result provided for display in response to the search, the first search result being ranked higher than the second search result in a search result ranking for the search; and providing a perceived second texture, different from the perceived first texture, by the tactile interface to at least the second portion of the display in response to the user contacting the second portion of the display, the perceived second texture providing a sensation to the user that the second portion of the display is raised from the display surface by a second perceived distance different from the first perceived distance, wherein the first perceived distance is greater than the second perceived distance based on the first search result being ranked higher than the second search result.

12. The method of claim 11, further comprising:
receiving contact from the user on the first user-selectable content item in the first portion of the tactile interface; and
retrieving additional content related to the first user-selectable content item based on the contact.

13. The method of claim 11, further comprising:
receiving contact from the user on the second portion of the tactile interface; and
in response to the contact from the user on the second portion of the tactile interface, retrieving additional content related to the second user-selectable content item based on the contact.

14. The method of claim 11, further comprising:
providing a third portion of the tactile interface having a perceived third texture that surrounds the first portion of the display, the perceived third texture being different from the perceived first texture.

15. The method of claim 14, wherein the perceived first texture is raised from the tactile interface of the display as compared to the perceived third texture.

16. The method of claim 11, further comprising presenting an advertisement.

17. The method of claim 11, further comprising:
at least partially obscuring the second portion with the first portion of the display.

18. The method of claim 17, further comprising:
receiving contact from the user to expose the obscured part of the second portion from the first portion; and
exposing the obscured part of the second portion from the first portion.

19. The method of claim 11, wherein the perceived first texture of the first portion of the display is indicative of an expected texture of a physical object represented by the first user-selectable content item.

20. The method of claim 19, wherein the expected texture of the physical object represented by the first user-selectable content item comprises a liquid and the perceived first texture of the first portion of the display is a wetted texture.

21. The method of claim 19, wherein the expected texture of the physical object represented by the first user-selectable content item comprises a gas and the perceived first texture of the first portion of the display is a bubbly texture.

22. The method of claim 19, wherein the expected texture of the physical object represented by the first user-selectable content item comprises a granular material and the perceived first texture of the first portion of the display is a gritty texture.

23. The mobile electronic device of claim 2, wherein the perceived third texture is raised from the tactile interface of the display as compared to the perceived first texture and the perceived second texture.

24. The mobile electronic device of claim 2, wherein the tactile interface is further operable to:
   identify a user contact of the third portion of the display;
   identify a user contact of the first portion of the display subsequent to the user contact of the third portion of the display;
   delay action in response to the user contact of the first portion of the display for a predetermined amount of time; and
   in response to determining that the user contact with the first portion of the display has met the predetermined amount of time, request additional content related to the first user-selectable content item.

25. The mobile electronic device of claim 1, wherein the tactile interface is further operable to channel heat from internal circuitry of the mobile electronic device to the first portion of the display based on the first user-selectable content.

26. A non-transitory computer storage medium encoded with a computer program, the program comprising instructions that when executed by data processing apparatus, cause the data processing apparatus to perform operations comprising:
   presenting a first user-selectable content item in a first portion of a touchscreen interactive display that has a display surface, the first user-selectable content item comprising a first search result provided for display in response to a search;
   causing a perceived first texture to be provided by a tactile interface to at least the first portion of the display in response to a user contacting the first portion of the display, the perceived first texture providing a sensation to the user that the first portion of the display is raised from the display surface by a first perceived distance;
   presenting a second user-selectable content item in a second portion of display that is different from the first portion of the display, the second user-selectable content item comprising a second search result provided for display in response to the search, the first search result being ranked higher than the second search result in a search result ranking for the search; and
   causing a perceived second texture, different from the perceived first texture, to be provided by the tactile interface to at least the second portion of the display in response to the user contacting the second portion of the display, the perceived second texture providing a sensation to the user that the second portion of the display is raised from the display surface by a second perceived distance different from the first perceived distance, wherein the first perceived distance is greater than the second perceived distance based on the first search result being ranked higher than the second search result.

\* \* \* \* \*